Figure 1:
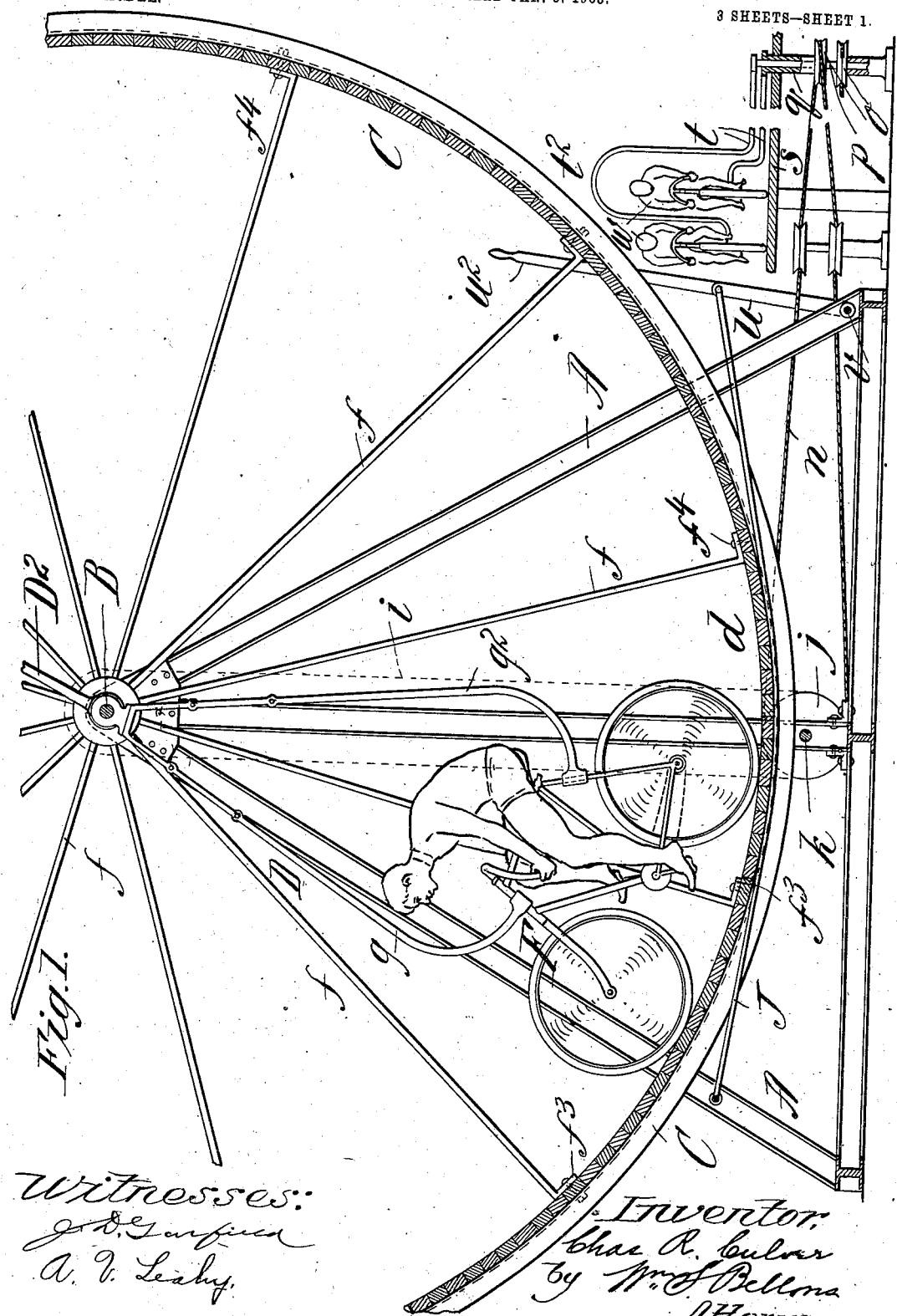

No. 724,672. PATENTED APR. 7, 1903.
C. R. CULVER.
AMUSEMENT APPARATUS.
APPLICATION FILED JAN. 3, 1903.
NO MODEL. 3 SHEETS—SHEET 1.

Witnesses:
Inventor:
Chas R. Culver
by Wm. S. Bellows
Attorney.

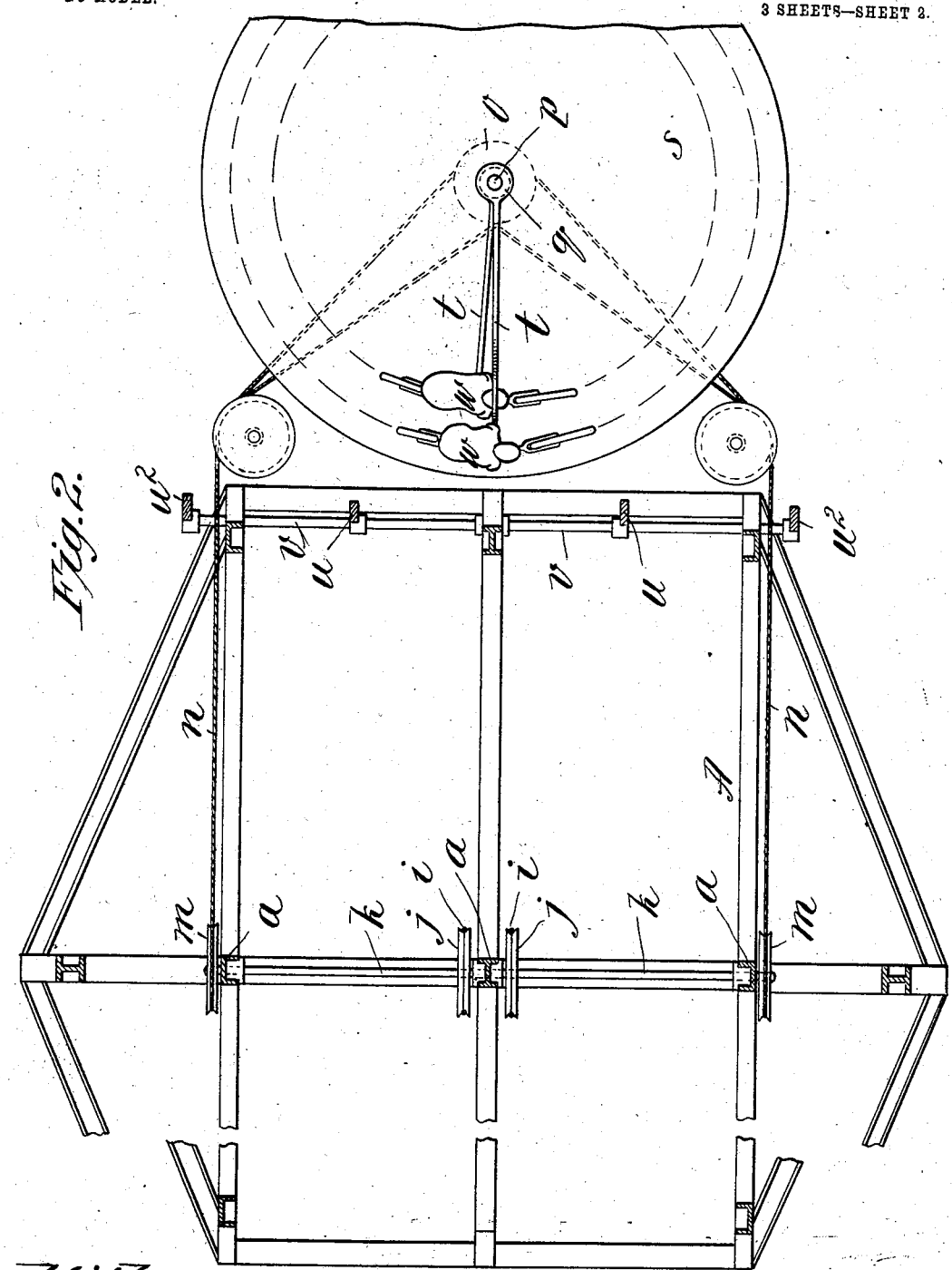

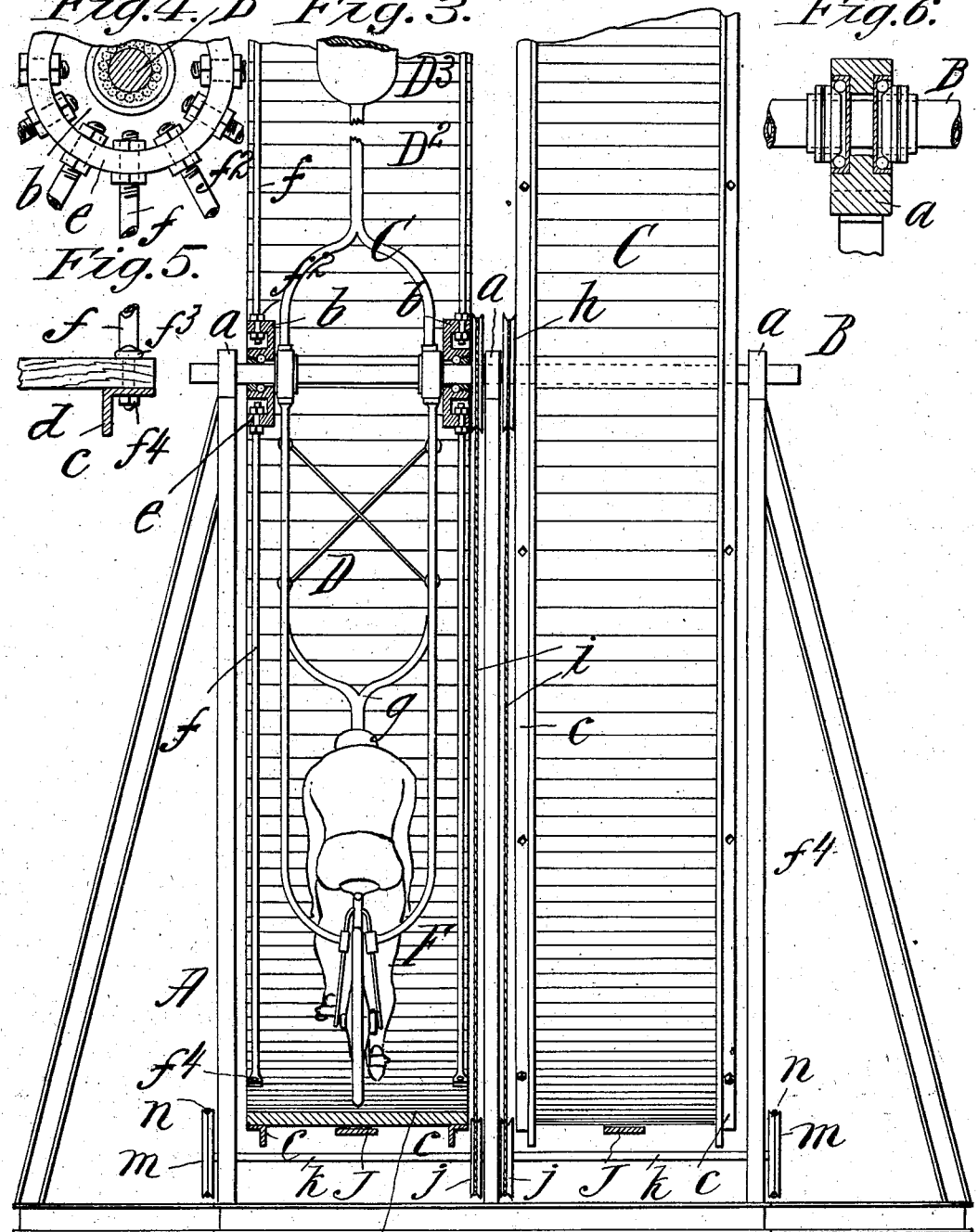

UNITED STATES PATENT OFFICE.

CHARLES R. CULVER, OF SPRINGFIELD, MASSACHUSETTS, ASSIGNOR TO HAROLD A. LEY, OF SPRINGFIELD, MASSACHUSETTS.

AMUSEMENT APPARATUS.

SPECIFICATION forming part of Letters Patent No. 724,672, dated April 7, 1903.

Application filed January 3, 1903. Serial No. 137,638. (No model.)

*To all whom it may concern:*

Be it known that I, CHARLES R. CULVER, a citizen of the United States of America, and a resident of Springfield, in the county of Hampden and State of Massachusetts, have invented certain new and useful Improvements in Amusement Apparatus, of which the following is a full, clear, and exact description.

This invention relates to an apparatus or device to be used for affording amusement to audiences.

The invention includes a comparatively large wheel mounted for rotation on an elevated support therefor and so constructed as to constitute an internal endless trackway, together with a vehicle, preferably a bicycle, to be surmounted and driven by a rider, such vehicle running within and having traction on the track-wheel, and there is, furthermore, combined with the bicycle means for constraining the same in the running thereof from becoming laterally displaced from the track-wheel, and as my invention is preferably carried out I arrange two of the elevated rotary track-wheels one back of the other in axial coincidence, providing in each the bicycle and constraining device connected therewith, so that riders in competition may drive their respective bicycles, the driving action thereof rotating the track-wheels in directions reverse to the direction of running of the bicycles, and I combine with the separately-rotatable track-wheels indicators, between which and the track-wheels are driving connections, so that by viewing the relative positions of the movable indicators it may be judged or determined which of the riders is leading or gaining.

The improved apparatus is illustrated in the accompanying drawings, in which—

Figure 1 is substantially a side elevation, the trackway constituted by the internal surface of the rim of the foremost wheel being shown in vertical section. Fig. 2 is a horizontal section and plan view showing the lower portion of the framing or supporting structure, the movable indicators, and the greater portion of the means of driving connection between the track-wheels and the said indicators. Fig. 3 is an elevation of the apparatus as taken at right angles to Fig. 1, the front or left-hand track-wheel being shown in vertical section. Figs. 4, 5, and 6 are views showing details of construction comprised in the track-wheel and the supporting-bearing therefor.

Similar characters of reference indicate corresponding parts in all of the views.

In the drawings, A represents the supporting structure, of any design having fitness to the purpose, the same as shown comprising a base and front, rear, and intermediate standards $a\ a$, supporting the shaft B in a horizontal position, and said shaft supports axially between the standards the track-wheels C C. Each track-wheel comprises separated hubs $b\ b$, fitted with ball-bearings for free rotation on the horizontal shaft B, the rim $d$ forming the annular trackway, such rim being constituted by matched wood sections, as indicated in Fig. 1, which rest upon the metallic rings $c$, the spokes $f$ connecting the hubs at the front and rear of the large wheels with the rim. The hub $b$ is shown as constructed with an annular flange through which the spokes have by their screw-threaded ends engagements receiving the nuts $f^2$ thereon, while the outer ends of the spokes have angularly-turned feet $f^3$, engaging against the inner side of the wood sections and being confined and united to said sections and the outer ring $c$ by the bolts and nuts $f^4$. The large cage-like wheels C C have such widths as to accommodate therewithin a bicycle and a rider thereof.

D represents a frame pivotally hung at its upper end to the horizontal fixed shaft B, extending downwardly therefrom to connection by its front and rear members $g\ g^2$, respectively, to the head and rear portions of the frame of the bicycle F. The bicycles are by the frames, while free to have revoluble movements within and tractionally upon the track-wheels, constrained against either tipping sidewise or running laterally.

Fixed on the track-wheels C C, coincident with the axes thereof, are pulleys $h$, around which are driving-cords $i$, which also run around and drive pulleys $j\ j$ on the separate counter-shafts $k\,k$, and on said counter-shafts are further pulleys $m\,m$, around which run driving-cords $n\,n$, which also have running engagements around driving-pulleys $o\,o$, respectively, on a vertically-mounted rotatable shaft $p$ and on a sleeve $q$, which surrounds and is rotatable about the shaft $p$, independently thereof, the upper extremities of both the shaft and sleeve $p\,q$ extending centrally upward above the surface of the fixed disk $s$, comprised in the indicating device. Radial arms $t$ are affixed to the shaft $p$ and the sleeve $q$, extending horizontally close to the upper face of the disk to revolve in the manner of the hands of a clock, one being permitted to pass the other, and secured to the outer ends of said arms $t\,t$ are miniature bicycles and riders, the arm $t$, extending to connection with the outer one of these miniature figures, being arched, as indicated at $t^2$, so as to form no impediment to the revoluble movements and passage by it of the inner miniature figure.

J represents a brake-strap, one end of which is hung to a part of the supporting-frame, while the other end thereof is connected to a suitably high part of a lever-arm $u$, mounted on a rock-shft $v$ and having the handle extension $u^2$. This brake device is understood as individual to and duplicated for both of the track-wheels.

The rider assuming his position on the bicycle, pedaling the same in the ordinary manner and driving the bicycle forwardly more or less up along the track-wheel induces a rearward rotational movement of such wheel, and the relative work done by two riders, while to some extent being appreciable by noting their relative positions, may be more certainly determined by the relative positions of the miniature figures $w\,w$ at the ends of the arms $t$. One or more assistants, who may after a while set the brakes to the track-wheels, will retard or stop the rotational movements of such wheels, whereupon the riders will shoot ahead around within the track-wheels and may entirely encircle therewithin, and by the use of the well-known back-pedal or other brakes on the bicycle F the riders, after developing a momentum movement in the backward direction of the track-wheels by setting the brakes, may, with their bicycles, be carried upwardly, rearwardly, around, in and with the track-wheels.

Various modifications in the constructions and arrangements shown may be made for substantially the same effects as stated without departing from this invention.

The frame D, connected with the bicycle and pivotally engaged with the supporting-shaft B, may have an extension $D^2$ to the opposite side of said shaft and be provided with a counterweight $D^3$, whereby the rider will be assisted in making a cycle within the track-wheel.

Having thus described my invention, what I claim, and desire to secure by Letters Patent, is—

1. An internal track-wheel and a support therefor on which it is axially mounted for rotation, a bicycle adapted to run within, and in traction on said track-wheel, a frame pivotally supported coincident with the axis of the track-wheel and having front and rear members connected with the head and rear portions of the bicycle respectively.

2. An internal track-wheel and a support therefor on which it is axially mounted for rotation, a bicycle adapted to run within, and in traction on, said track-wheel, having propulsion means therefor, an indicator mounted for rotation and connections between the track-wheel and said rotary indicator.

3. A supporting-frame having a horizontal shaft, two internal track-wheels axially supported on said shaft for independent rotation, one back of the other, vehicles to run within and in traction on, said trackway, having propulsion means therefor, two movable indicators, and connections between the respective track-wheels and said indicators whereby the movements of the indicators may correspond to those of the track-wheels.

4. A supporting-frame having a horizontal shaft, two internal track-wheels axially supported on said shaft for independent rotation, one back of the other, bicycles to run within, and in traction on, said track-wheels and frames suspended from said shaft and connected to the bicycles.

5. A supporting-frame having a horizontal shaft, two internal track-wheels axially supported on said shaft for independent rotation, one back of the other, bicycles to run within and in traction on, said track-wheels, and means for preventing said vehicles from running laterally off from the annular track-wheels, and brakes separately operable on the track-wheels.

6. A supporting-frame having a horizontal shaft, two internal track-wheels axially supported on said shaft for independent rotation, one back of the other, bicycles to run within and in traction on, said track-wheels, frames hung axially with the shaft, connected to said vehicles, a circular stationary disk, two indicators mounted for independent movement around on said disk, and cord and pulley connections between the track-wheels and said rotary indicators corresponding thereto.

7. In an amusement apparatus of the character described, in combination, a supporting-frame and a horizontal shaft mounted in an elevated position thereon, two internal track-wheels axially mounted for rotation on said shaft, one back of the other, frames pivotally hung on said shaft and bicycles connected to said frames and arranged to run on and within each of said track-wheels, a fixed horizontal disk, a shaft and a sleeve surrounding said shaft mounted for rotation centrally of said disk and having radial arms carrying figures in miniature, and means respectively between the track-wheels and said sleeve and the sleeve-surrounded shaft for driving said latter parts correspondingly to the rotations of the track-wheels.

8. In an amusement apparatus of the character described, in combination, a supporting-frame and a horizontal shaft mounted in an elevated position thereon, two internal track-wheels axially mounted for rotation on said shaft, one back of the other, frames pivotally hung on said shaft and bicycles connected to said frames and arranged to run on and within each of said track-wheels, a fixed horizontal disk, a shaft and sleeve mounted for rotation centrally of said disk and having radial arms carrying figures in miniature, pulleys respectively on said shaft and sleeve, pulleys respectively affixed on the track-wheels, two separate counter-shafts each having two pulleys, a driving-cord running around each track-wheel pulley and a counter-shaft pulley, and a driving-cord around another of the counter-shaft pulleys, and in driving engagement around the sleeve-pulley, and sleeve-surrounded shaft-pulley, respectively.

Signed by me at Springfield, Massachusetts, in presence of two subscribing witnesses.

CHARLES R. CULVER.

Witnesses:
WM. S. BELLOWS,
A. V. LEAHY.